INVENTORS
ROGER H. APPELDORN
DAVID C. GILKESON
BY

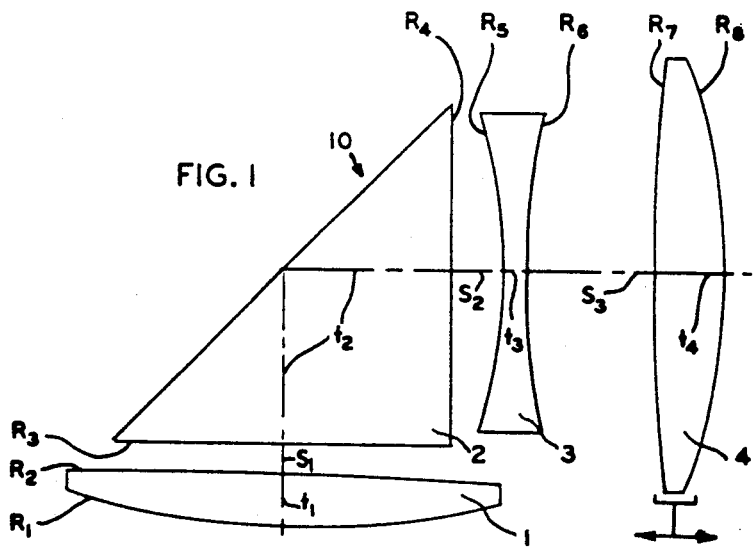

*Carpenter Abbott Coulter & Kinney*
ATTORNEYS

United States Patent Office 3,408,135
Patented Oct. 29, 1968

3,408,135
PROJECTIVE OBJECTIVE HAVING THREE ELEMENTS PLUS AN INTEGRAL RIGHT ANGLE PRISM
Roger H. Appeldorn, White Bear Lake, Minn., and David C. Gilkeson, Irondequoit, N.Y., assignors to Minnesota Mining and Manufacturing Company, St. Paul, Minn., a corporation of Delaware
Continuation of application Ser. No. 151,611, Nov. 13, 1961. This application Apr. 12, 1966, Ser. No. 547,706
2 Claims. (Cl. 350—202)

This application is a continuation of our application Ser. No. 151,611, filed Nov. 13, 1961, now abandoned.

This invention relates to an optic lens system and more particularly to a lens system or assembly for use in overhead projectors. It will be understood, however, that the lens system of the present invention may also be used in other optical equipment such as viewers and cameras where it is desirous to bend the optic path in a compact unit.

The overhead projectors of the prior art have conventionally employed an optic system including a three element projection lens and a flat mirror, the mirror being located either between the transparency and the lens, or between the lens and the screen. The flat mirror is used to bend the optic axis or path from a vertical to a horizontal orientation. As a result of the aforementioned arrangement the prior art machines are large and bulky.

The prior art devices aforementioned have the further disadvantage that no really satisfactory focusing means is provided. Projectors having means for focusing usually require the movement of the entire projection head vertically with respect to the stage or movement of the lens assembly vertically or horizontally with respect to the mirror, often resulting in vignetting and variation in screen illumination.

It is, therefore, an object of the present invention to provide a projection lens assembly of unusually compact construction which is particularly well adapted for use in an overhead projector and which permits such projectors to be substantially smaller than known projectors capable of projecting transparencies of similar size.

The present invention has as a further object to provide a lens assembly of the aforementioned character in which the focusing can be readily accomplished without substantial vertical shifting of the screen image and without vignetting or degrading the uniformity of screen illumination.

A further object of the present invention is to provide a lens system or assembly which when used in an overhead projector may be readily focused on a screen at any distance beyond, for example, 2.4 feet without moving the entire optical assembly vertically or without moving the entire machine toward or away from the screen.

These and other desirable objects will become more apparent upon perusal of the following description in conjunction with the accompanying drawing.

In the drawing:

FIGURE 1 is a diagrammatic view of one form of lens assembly constructed in accordance with the present invention;

FIGURE 2 shows in tabular form the optical values for the lens system illustrated in FIGURES 1 and 2, respectively.

Figure 3:
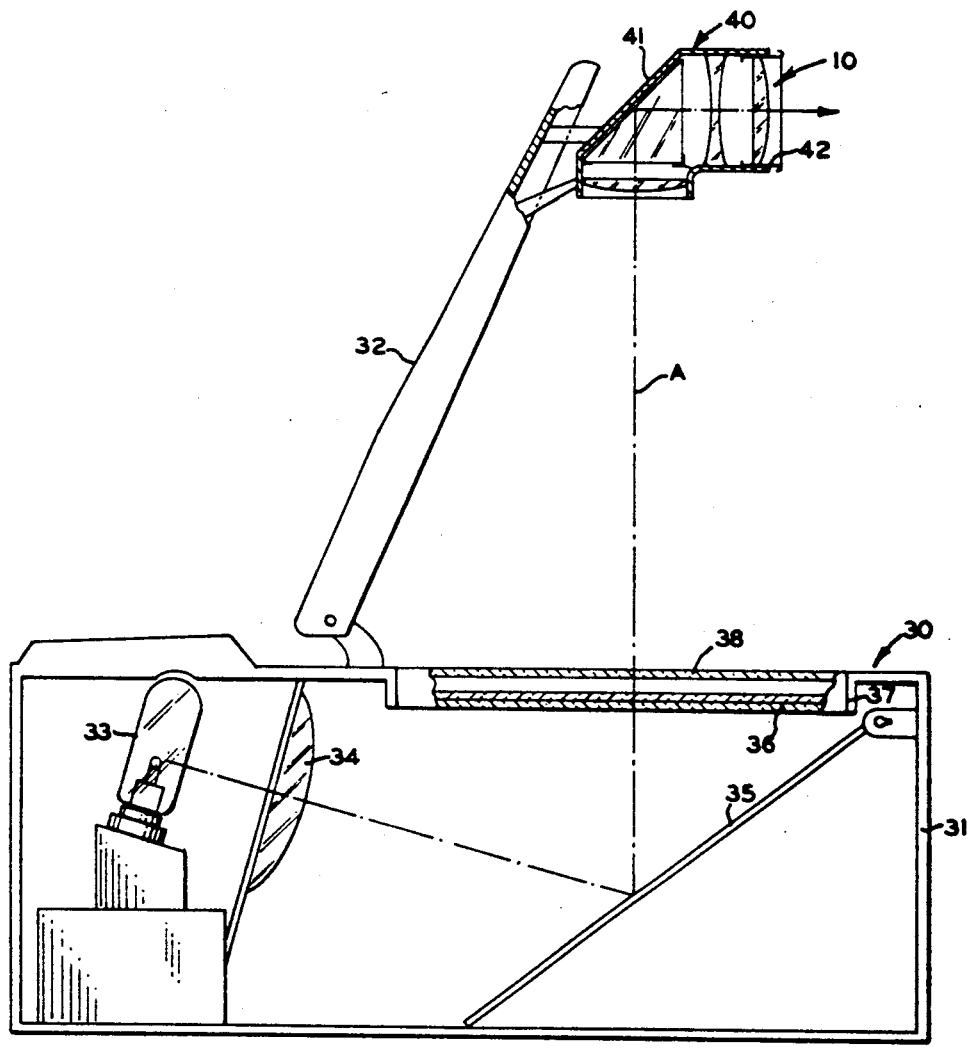
FIGURE 3 is a diagrammatic view of an overhead projector incorporating one embodiment of the invention.

The lens of the present invention finds particular advantage when incorporated in an overhead projector, for example, of the type illustrated in FIGURE 3. The overhead projector in FIGURE 3 generally designated by the numeral 30 comprises a box-like case 31 to which is suitably attached a top cover 32. Positioned in one end of the case 31 is a suitable light source 33, such as a lamp having an incandescent filament and preferably containing a reflector (not shown) to insure maximum utilization of all of the available light. Light rays from the source 33 pass through a condensing lens 34 and impinge upon a mirror 35 having a flat reflective surface. The light is reflected from the mirror 35 vertically upward through a pair of back-to-back Fresnel condensing lenses 36 and 37 and a flat piece of glass 38 forming a transparent stage at the upper surface of the case 31. The object to be projected is placed upon the stage 38 and as a result of the condensing lenses, the light and image of the object are directed upwardly in a cone of light which is intercepted by a series of lenses in a projection head 40 such that the apex of the cone of light is within the projection head 40. The projection head 40, as diagrammatically shown in FIGURE 3, includes a lens system 10 embodying the present invention and which will be discussed in more detail as this description proceeds. The head 40 comprises a rigid housing 41 suitably attached to the cover 32 and a telescoping barrel member 42 which movably supports one of the lenses of the aforementioned system 10. The barrel 42 may be telescoped into the housing 41 by means of a helical groove arrangement or other suitable means well known in the art to afford axial adjustment of the position of the lens supported therein for focusing of the projected image. The optic axis of the overhead projector is shown by the broken line A.

In the following description the expression "transparency" denotes the object to be projected, usually 10 inches by 10 inches in size but not necessarily limited to this size, and the expression "screen" denotes the receiving surface upon which the image is to be projected. This receiving surface may be a wall or screen. The "object distance" is the distance between the transparency and the lens, and the "image distance" is the distance between the lens and the screen. The lens elements are numbered consecutively from front to rear, the front being defined as the side of the lens which first receives incident radiation from the transparency and the rear being defined as the side of the lens closer to the screen.

The radii of curvature R, the axial thicknesses $t$ of the lens elements, and the airspacings S between elements, are expressed in the customary manner, with the usual subscripts indicating a particular surface, thickness or airspace, numbered in sequence from front to rear. The plus values of the radii R indicate surfaces convex to the incident radiation and the minus values of the radii R indicate surfaces concave to the incident radiation, in accordance with conventional notation, while a radius of infinity or $\infty$ indicates a plane surface. The respective refractive indices $N_D$ are expressed in reference to the spectral D line, and the dispersive indices or Abbe numbers are indicated by V. The focal length of an individual lens element is indicated by $f$ with a corresponding subscript whereas F denotes the equivalent focal length of the lens system.

Referring now to FIGURE 1 of the drawing, the lens system 10 comprises a lens element 1 of the positive or converging type spaced a fixed distance $S_1$ from a right triangular prism 2 which is also a lens element but has a focal length of infinity. The prism 2 is integrated optically into the lens system and serves to bend the optic axis from a vertical to a horizontal orientation as shown in FIGURE 1. A negative or diverging lens element 3 is axially aligned with the horizontal optic axis and is spaced a distance $S_2$ from the adjacent prism surface or side. A positive or converging lens element 4 is axially aligned with lens element 3 and is provided with suitable mounting means (shown in FIGURE 3) rendering said element axially movable relative to the lens element 3 to vary the spatial relationship $S_3$ therebetween. The aperture stop of the lens system 10 is positioned within the prism or near the rear surface $R_4$ of the prism. Axial movement of lens element 4 allows focusing of the projected image on a screen a reasonable distance from the machine without substantial movement of the aperture stop and without degradation of the intensity and uniformity of screen illumination. Further, this arrangement permits the prism 2 to be of minimum size and it also makes most efficient use of the lens elements. The prism 2 may, if desired, have truncated corners to provide space conservation without any decrease in its effectiveness.

It has been found that the above-mentioned objects are obtained by the use of a lens system 10 in which the indicated variable factors lie numerically within the ranges set forth in Table 1 below, F being the equivalent focal length of the lens system when $S_3$ is 23.3 mm.

Table 1

$.58F < +f_1 < .73F$
$f_2 = \infty$
$.27F < -f_3 < .36F$
$.39F < +f_4 < .50F$
$.40F < +R_1 < .52F$
$2.80F < -R_2 < 3.82F$
$R_3 = \infty$
$R_4 = \infty$
$.25F < -R_5 < .33F$
$.54F < +R_6 < .68F$
$3.53F < +R_7 < 4.51F$
$.26F < -R_8 < .34F$ A specific example of lens system 10 whose variables fall within the above-mentioned limits and which meets all the outlined requirements is illustrated by FIGURE 2 of the drawing, the various symbols therein having the well known meanings explained above. When constructed in accordance with the numerical data of FIGURE 2, the lens system has an equivalent focal length of 358 mm. at an airspace $S_3$ of 23.3 mm. and has a relative aperture $f:5.2$.

In the use of this exemplary lens system of FIGURE 2, the distance from the transparency to the horizontal optical axis is preferably held constant at 422.5 mm., and the focus at desired image distances may be obtained by axially moving the lens element 4. The variations in image distance and magnifications as functions of the various values of $S_3$ are stated below in Table 2.

It is to be understood, however, that the airspace $S_3$ may have any value between 15.7 and 30.7 mm. and not just the values given in the table below.

TABLE 2

| $S_3$ | Image distance, ft. | Magnification |
|---|---|---|
| 30.7 | 4.5 | 3.2X |
| 23.2 | 6.8 | 5.0X |
| 15.7 | 15.0 | 11.4X |

A projection lens of the type defined by Table 1 finds its greatest utility in projectors for presenting information to an audience under conditions wherein an exceptionally large image is not required.

The use of the lens system 10 in an overhead projector of the type shown in FIGURE 3 has a number of advantages over previously known overhead projectors. The improved projection system utilizing an integrated prism as the light bending means lends a high degree of compactness permitting the head 40 to be of substantially smaller size than known projection head assemblies. The head 40 is of rugged construction and the area of the exposed glass which may be scratched in use is greatly reduced. Additionally, the improved lens construction permits the projection head 40 to be positioned a greater than normal distance above the stage. This greater distance, together with the aforementioned compactness, makes the stage more accessible to the operator, allowing more freedom of movement than previously known construction in which bulky heads are positioned close to the stage. Additionally, this compact head assembly presents much less obstruction to the view of the screen as compared to the bulky heads of previously known overhead projectors. The versatility of the improved lens construction and the fact that the image may be focused at any reasonable distance from the screen without decreasing the intensity or uniformity of screen illumination overcomes many of the annoying inconveniences presented by existing constructions.

Although only preferred embodiments of the invention have been shown and described, it will be understood that various changes and modifications may be made without departing from the spirit of the invention. For example, the relative aperture value of the lens system 10 is not limited to the given value of $f:5.2$, but may be of any suitable or desired value. Further, the prisms of the lens system 10 need not be a 45° right angle, but may differ to produce the optical deflection desired. All such changes and modifications are contemplated as may come within the scope of the appended claims.

We claim:

1. A lens system consisting essentially of four airspaced lens elements, one of said elements being a triangular prism integrated in said system for changing the direction of the optic axis of the lens system, the other three of said elements being optically aligned along said optic axis, the first of said three elements being a biconvex lens positioned adjacent one side of the prism, the second being a biconcave lens positioned adjacent the other side of the prism, and the third being a biconvex lens positioned adjacent said biconcave lens and movable along the optic axis to provide a variable spacing from said biconcave lens, and wherein the characteristics of the lens elements and their spatial relationship are substantially as in the following table:

| Lens | $N_D$ | V | Radii, mm. | Thicknesses and airspaces, mm. |
|---|---|---|---|---|
| 1 | 1.6203 | 60.3 | $R_1 = +165.25$ | $t_1 = 9.5$ |
|   |        |      | $R_2 = -1166.0$ | $S_1 = 5.6$ |
| 2 | 1.5170 | 64.5 | $R_3 = \infty$  | $t_2 = 63.5$ |
|   |        |      | $R_4 = \infty$  | $S_2 = 10.0$ |
| 3 | 1.621  | 36.2 | $R_5 = -104.0$  | $t_3 = 4.3$ |
|   |        |      | $R_6 = +216.6$  | $S_3$ varies 15.7 to 30.7 |
| 4 | 1.6230 | 56.9 | $R_7 = +1,425.0$ | $t_4 = 13.0$ |
|   |        |      | $R_8 = -107.0$  |  | wherein the lens elements are numbered in sequence from front to rear; $N_D$ indicates the respective refractive indices for the spectral D line; V indicates the dispersive indices; the radii of curvature R of the lens surfaces, the axial thicknesses $t$ of the lens elements and the airspaces S between lens elements being identified by subscripts numbered in sequence in the same order as the lens numbers, plus and minus values of R indicate surfaces which are respectively convex and concave to radiation entering the lens system at lens 1; and the quantities R, $t$ and S are expressed in millimeters for a lens system having an equivalent focal length of substantially 358 millimeters and vary proportionately for lens systems having other equivalent focal lengths.

2. A lens system consisting essentially of four airspaced lens elements, one of said elements being a triangular prism integrated in said system for changing the direction of the optic axis of the lens system, the other three of said elements being optically aligned along said optic axis, the first of said three elements being a biconvex lens positioned adjacent one side of the prism, the second being a biconcave lens positioned adjacent the other side of the prism, and the third being a biconvex lens positioned adjacent said biconcave lens and movable along the optic axis to provide a variable spacing from said biconcave lens, and wherein said lens elements have the following numerical characteristics:

$$.58F < +f_1 < .73F$$
$$f_2 = \infty$$
$$.27F < -f_3 < .36F$$
$$.39F < +f_4 < .50F$$
$$.40F < +R_1 < .52F$$
$$2.80F < -R_2 < 3.82F$$
$$R_3 = \infty$$
$$R_4 = \infty$$
$$.25F < -R_5 < .33F$$
$$.54F < +R_6 < .68F$$
$$3.53F < +R_7 < 4.51F$$
$$.26F < -R_8 < .34F$$

wherein F is the effective focal length of said lens system, the focal lengths $f$ of the individual lens elements and the radii of curvature R of the lens surfaces being identified by subscripts numbered in sequence starting from said first of said other three elements, plus and minus values of R indicating surfaces which are respectively convex and concave to radiation entering the lens system at said first element.

References Cited

UNITED STATES PATENTS

| | | |
|---|---|---|
| 1,860,575 | 5/1932 | Gehrke. |
| 2,053,224 | 9/1936 | Reason. |
| 3,062,916 | 11/1962 | Kingsbury et al. |

FOREIGN PATENTS 343,850    11/1921    Germany.

DAVID SCHONBERG, *Primary Examiner.*

R. J. STERN, *Assistant Examiner.*